United States Patent [19]

Lucien

[11] Patent Number: 4,534,594
[45] Date of Patent: Aug. 13, 1985

[54] LEG-REST, NOTABLY FOR TRANSPORT VEHICLES AND ESPECIALLY FOR AEROPLANES

[75] Inventor: Staub Lucien, Paray-Vieille-Poste, France

[73] Assignee: The National Company Air France, Paris, France

[21] Appl. No.: 677,321

[22] Filed: Dec. 3, 1984

Related U.S. Application Data

[63] Continuation of Ser. No. 355,360, Mar. 8, 1982, abandoned.

[30] Foreign Application Priority Data

Mar. 16, 1981 [FR] France ............................... 81 05255

[51] Int. Cl.³ ............................................. A47C 7/52
[52] U.S. Cl. ...................................... 297/438; 16/291; 297/429; 297/436
[58] Field of Search ............... 297/429, 433, 436, 438; 16/291, 293

[56] References Cited

U.S. PATENT DOCUMENTS

| | | | |
|---|---|---|---|
| 560,752 | 5/1896 | Prator | 297/438 X |
| 586,432 | 7/1897 | Gower | 297/433 X |
| 1,534,790 | 4/1925 | Koken | 297/434 X |
| 2,044,992 | 6/1936 | May | 297/436 X |
| 2,514,447 | 7/1950 | Hendrickson et al. | 297/436 |
| 2,559,127 | 7/1951 | Lyon | 297/434 |
| 2,849,051 | 8/1958 | Streeter III | 297/434 X |
| 2,872,698 | 2/1959 | Gommels | 16/291 |
| 2,903,149 | 9/1959 | Turner | 16/291 |
| 3,858,938 | 1/1975 | Kristensson et al. | 297/433 X |
| 4,264,103 | 4/1981 | Peresada et al. | 297/436 X |

FOREIGN PATENT DOCUMENTS 804978 11/1936 France ............................... 297/433

Primary Examiner—William E. Lyddane
Assistant Examiner—Peter R. Brown
Attorney, Agent, or Firm—Fred A. Keire

[57] ABSTRACT

In this leg-rest, which consists of a fixed housing (9), able to be secured to a luggage rail (7) of a chair, and of four flaps (10, 11, 12, 13) articulated to each other, the flap (10) which is pivotable on the housing (9) is in addition linked to the latter by two pneumatic jacks (34) which hold the said flap (10) in an automatic and permanent manner either in a folded (10') or opened out position.

Especially applicable to aeroplane chairs.

14 Claims, 6 Drawing Figures

U.S. Patent   Aug. 13, 1985   Sheet 1 of 3   4,534,594
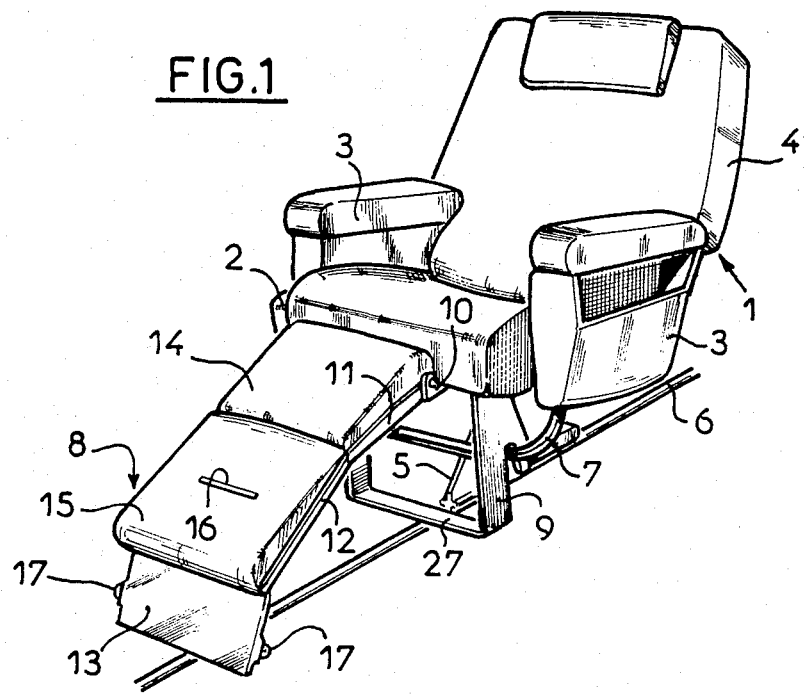
FIG.1
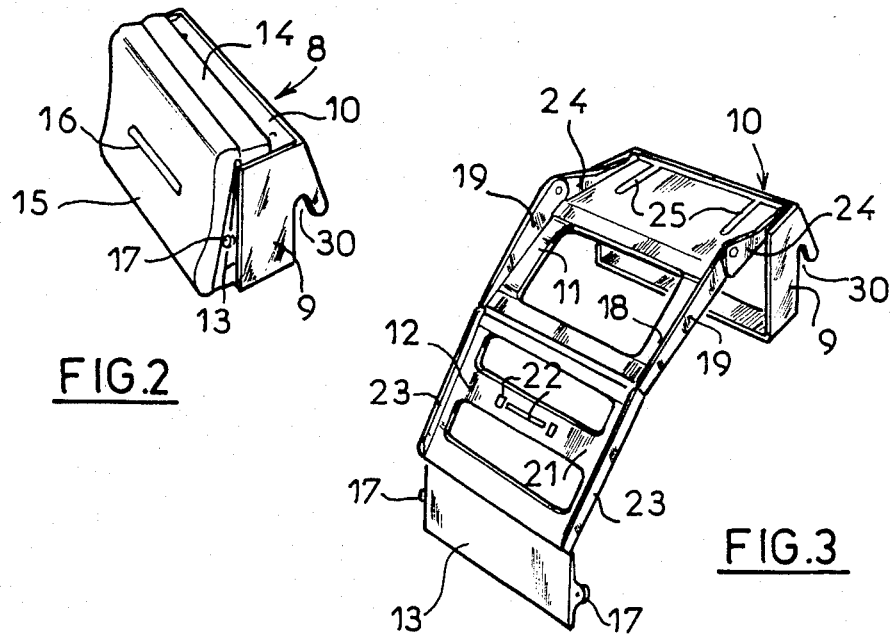
FIG.2
FIG.3

LEG-REST, NOTABLY FOR TRANSPORT VEHICLES AND ESPECIALLY FOR AEROPLANES

This application is a continuation of application Ser. No. 355,360, filed Mar. 8, 1982, abandoned.

The present invention concerns an independent leg-rest able to be adapted to all types of chairs, notably for transport vehicles and more particularly aeroplanes especially chairs, of the type having at least one movable flap able to be retracted into and/or under the seat and pivotting on a fixed part mounted on the latter.

Different types of chairs or armchairs are already known and are used in various means of transport and notably in aeroplanes, and which the passenger can alter positionally, within certain limits. In certain cases, in order to improve the comfort of the passengers, above all on long journeys, a leg-rest is also provided of the sort that is withdrawn under or into the frame of the chair in the out-of-use position, and can be unfolded or extended in front of the chair in its position for use by the passenger.

Generally such leg-rests are made up of a sort of plate or flap pivotting on a fixed part of the chair or on a telescopic rod on slides fixed to the chair. In many cases—when they are not inefficient—these leg-rests have a relatively fragile structure and are often delicate in conception. In addition these systems either do not have any lock in the leg-resting position, or when they do have a lock, it involves control operations or manipulations, pressing and/or latching bits of mechanism, which the user has to do himself and manually, which in any case represents a bother for him, takes time and is furthermore inconvenient because of the relatively small space between the successive rows of chairs.

In addition, such leg-rests are very often fast with the chairs and to replace them when worn or when there is a change in equipment requires the almost inevitable replacement of the seat of the chair and/or all the lower structure of the latter and even sometimes the whole chair assembly.

That is why the present invention has as its aim the making of a leg-rest that is independent of the chair, but to be adapted to all kinds of chair, not having the disadvantages of the prior art leg-rests mentioned above, while being simple and strong, with a firm holding in folded position and in unfolded position without needing any pressing, locking or latching action on the part of the user.

This problem is solved according to the invention by means of a leg-rest of the above-mentioned type, thanks to the fact that the moveable flap is in addition linked to the fixed part of the leg-rest by a device for automatic and permanent holding of the flap in folded position and in open position. Thanks to this arrangement, the user of the leg-rest has no longer to carry out delicate actions, more or less complicated and/or tricky to carry out, only the folding or opening out of the leg-rest. In addition, the automatic and permanent action of this holding device does away with all the usual arrangements with locking screws, latches or suchlike, which are to hold the assembly of the leg-rest in its folded and opened out positions and therefore contributes to simplifying its functioning, at the same time giving it a great reliability in use.

According to one advantageous characteristic of the invention, the automatic holding arrangement is made up of at least one member exerting an elastic compression and urging the movable flap into either its folded-back or opened-up position; in a particularly appropriate manner, the holding device can be made up of two pneumatic jacks of the sort with cylindrical sleeve and piston and of which the sleeve is hingedly linked to the fixed part of the leg-rest and of which the rod is hingedly linked to the movable flap; in a variation, it can be made up of two compression springs, of which one end is attached to the fixed part of the leg-rest and of which the other end is attached to the movable flap. These embodiments of leg-rest have the advantage of effecting the automatic holding in position of the leg-rest by means of the simple but reliable and efficient action of the elasticity of the jacks or compression springs, with a simple and strong make-up. In addition, such integers can exert a very intense holding action while having very small dimensions, which helps to minimise the amount of space taken up by the leg-rest.

In addition, according to an advantageous variation of embodiment of the invention, the fixed part of the leg-rest is made up in the form of a housing designed to contain the movable flap and having two lateral vertical side-plates, joined on one of their edges, by an oblique plate and carrying, on their upper ends, bearings in which the movable flap pivots. Thanks to this arrangement, the movable flap is in addition protected in its folded-up position by the housing in which it is placed.

Other characteristics and advantages of the invention will appear from the following description, by way of nonlimitative example, and with reference to the attached drawings in which:

FIG. 1 shows a schematic view in perspective of an aeroplane chair having a leg-rest according to the invention, in the opened out position;

FIG. 2 shows a perspective view of the leg-rest of FIG. 1 in the folded-up position;

Figure 4:
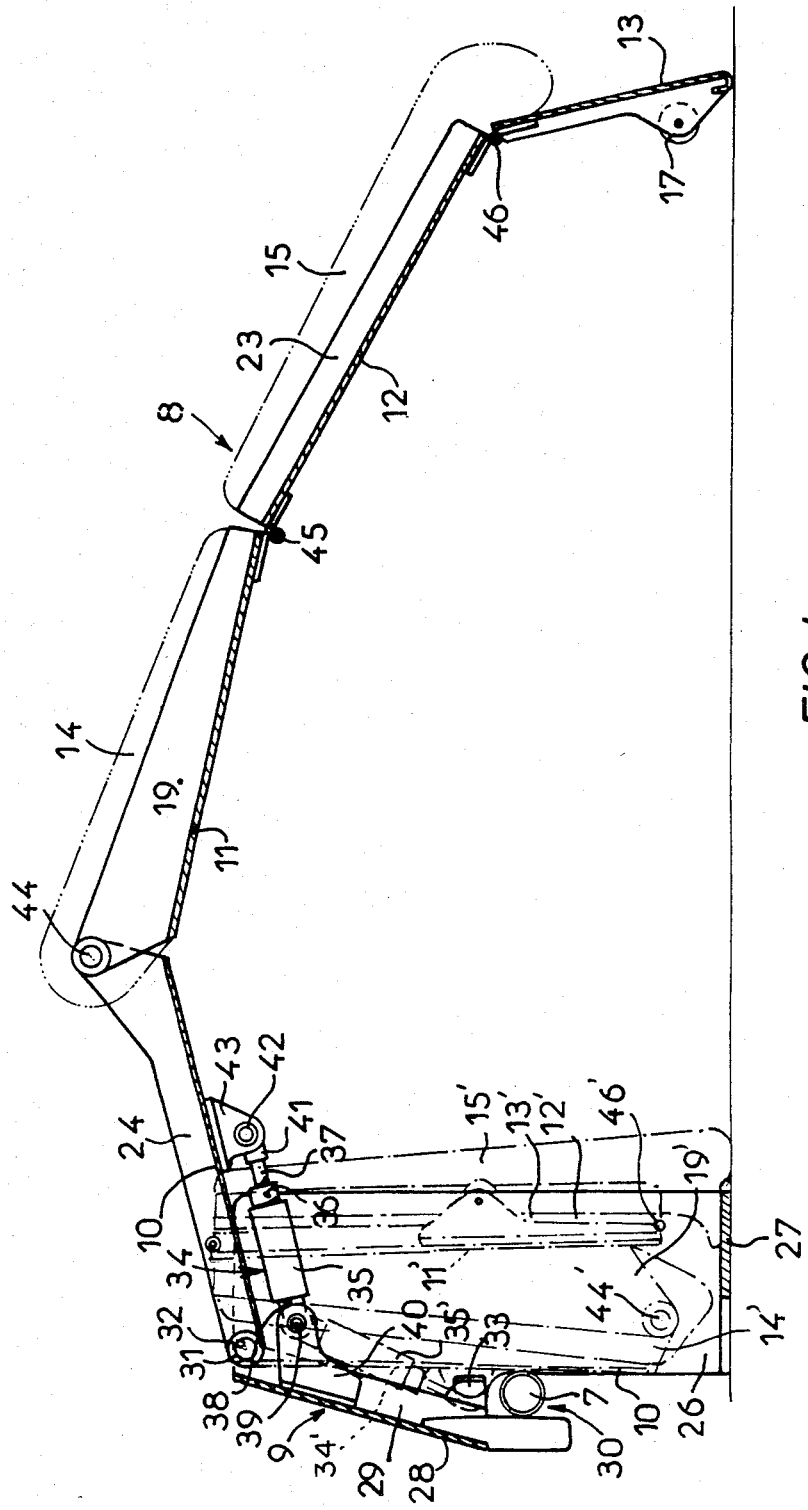
Figure 5:
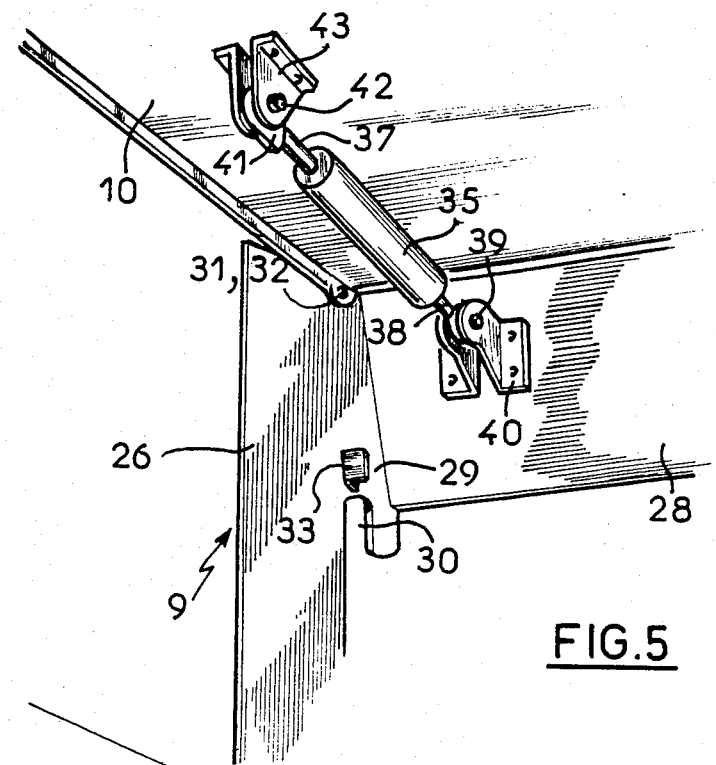
Figure 6:
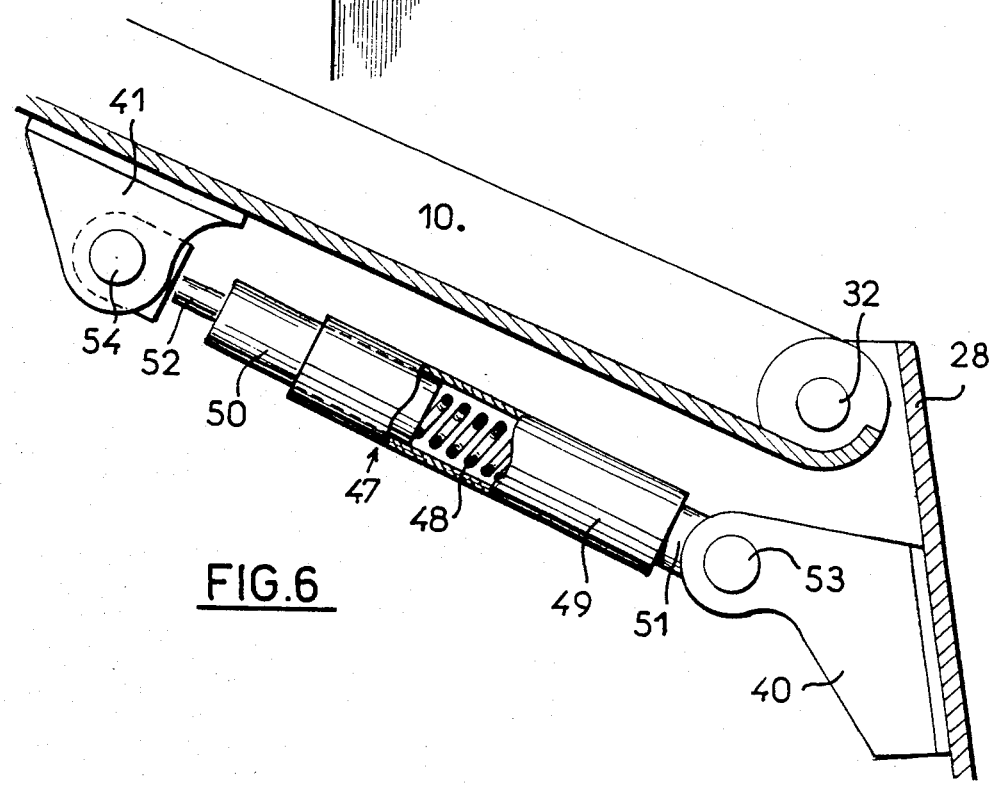

FIG. 3, similar to FIG. 1, shows a view of the leg-rest in the opened-up position, of which the cushions have been removed;

FIG. 4 shows a view in longitudinal section on a larger scale, of a leg-rest according to the invention, in the completely opened-out position;

FIG. 5 show a view of the detail of one part of the leg-rest of FIG. 4;

FIG. 6 shows, in a part-view, a variation of embodiment of the object of the invention.

In FIG. 1, there is shown a diagrammatic perspective view of a chair 1 of a transport vehicle particularly an aeroplane, roughly classical in shape having a seat cushion 2 enclosed by two arm-rests 3, and a back-rest 4. The latter is in the normal sitting position only slightly inclined relative to the vertical, whilst in the case of its position of ease or of relaxation for the passenger in which it is shown in FIG. 1, it is swung backwards, which displaces the sitting cushion 2 frontwards while causing it to rise slightly and come out of the chair as shown. This system is known and will not be described in more detail. As is usual, the chair is fixed by a support or foot 5 to a fixing rail 6, and has in addition, at a level between the seat 2 and the ground and/or fixing rail 6, a horizontal luggage bar 7 arranged transversely relative to the chair and intended to hold any luggage placed underneath the chair.

The leg-rest according to the invention, which is placed between the seat 2 and the ground/fixing rail 6, in its folded up, out-of-use position (see FIG. 2), is an independent assembly which can be attached in a way described later in more detail, to the luggage bar 7 of the chair and fixed to its fixing rail 6 by an appropriate means of the standard type, with screws, latches or the like. The leg-rest is made up of a fixed part 9, making up a housing and being adapted for containing and protecting the leg-rest assembly 8 in its folded up position underneath the chair 1, or flaps 10, 11, 12 hinged to each other and of a hinged prop 13 made likewise in the shape of a flap and which bears on the ground. The flaps 11 and 12, for supporting the passenger's legs when in his relaxation position, are in addition provided with removable cushions 14 and 15, the latter being furnished with a handle 16 for allowing the unfolding of the leg-rest. Finally, the flap forming the prop 13, has two teats or preferably two lateral buttons 17, causing, simply by pressure, the disengaging of the prop in order to raise the leg rest, as will be seen later in more detail.

All the elements of the leg-rest 8 are likewise visible in FIGS. 2 and 3.

FIG. 2 shows the leg-rest in the out-of-use position, i.e. in its folded up or retracted position under the chair 2 (FIG. 1). In this position, the flap 13 forming the prop is first of all folded up against the inside surface of the flap 12, itself folded up against the flap 11, in such a way that its cushion 15 carrying the handle 16 is turned outwardly, whilst the flap 11 is folded back against the flap 10 after lowering of their common hinge. This accordion-type folding allows the assembly of movable flaps of the leg-rest to be put into the fixed part 9 forming the housing, which efficiently protects the assembly.

FIG. 3 shows the leg-rest 8 in its position of use, i.e. completely opened out, similarly to that in FIG. 1, but without the movable cushions 14 and 15 of the flaps 11 and 12 in order to have a better view of the assembly of flaps (likewise visible in longitudinal section in FIG. 4). The flap 11 is made up of a flat rectangular frame 18, of which the short lateral sides have lateral vertical wings 19 gripping between them the cushion 14 in the set-up condition. The flap 12 is formed by a flat rectangular frame 20, of the same external dimensions as the frame 18, having in addition a small middle bar 21 which links its two short lateral sides and is pierced with holes, referred to generally as 22, in which is fastened the handle 16. In addition, the short sides of this frame 20 likewise have vertical lateral wings 23 gripping between them the cushion 15, in the set-up condition. Finally the flap 10 is made up of a flat rectangular palte the lateral edges of which have vertical wings 24. As is seen in more detail in FIG. 4, this flap 10 is hinged onto the fixed housing 9 and has in addition two slits 25 parallel to each other and to the lateral edges of the plate, the reason for which will be clarified with reference to FIG. 4. In the same way the flaps 10, 11, 12, 13 are hinged between themselves as is shown in a more detailed way in this Figure.

In FIG. 4, which shows a view in longitudinal section, on a larger scale of the leg-rest 8 according to the invention in the completely opened-out position, i.e. in its position of use shown in FIG. 1, it can be seen (also in conjunction with FIGS. 1 and 3) that the fixed part 9 forming the housing is made up of two vertical lateral side-plates 26 roughly rectangular in shape and joined at their bases by a horizontal flat bar 27 which can be fixed by any appropriate known means (not shown) to the rail 6 for fixing the chair. On its back part, turned towards the underneath of the chair, the housing 9 carries an oblique plate 28 the lateral sides of which are fast with triangular lateral extensions 29 of the side-plates 26, which have vertical voids 30 allowing the housing 9 of the leg-rest to be hooked onto the luggage bar 7 of the seat.

At their upper ends the lateral side-plates 26 of the housing 9 have holes 31 forming bearings for the lateral ends in the form of teats or of pivots 32, which carry the lateral wings of the flap 10 and which allow the latter to pivot freely. Stops 33, for example in the form of tabs bent at right-angles and of which one branch is fixed onto the internal surface of the side-plate 26, allow the flap 10 to be stopped in the vertical position during its folding in the housing 9.

As is seen clearly in FIG. 4, besides being linked with the possibility of rotation at 31,32 the movable flap 10 is likewise linked to the fixed part forming the housing 9 of the leg-rest 8 by a mechanism for the automatic and permanent holding of the flap 10 in its folded-up and opened out positions (as will be described below), made up of two pneumatic jacks 34 of the type with a cylindrical sleeve 35 and piston 36, and of which the sleeve 35 is articulated to the oblique plate 28 and of which the piston rod 37 is articulated to the movable flap 10. The articulation of the sleeve 35 on the plate 28 is done by means of a tab 38 fast with the sleeve and able to turn freely on an axis 39 mounted fixedly in two flat parallel supports 40 fixed as a bracket onto the plate 28 and between which extends the end of the tab 38. The articulation of the rod of the piston 37 on the flap 10 is done similarly and is carried out by means of a tab 41 fast with the piston rod and pivotable about an axis 42 mouned fixedly in two flat parallel supports 43 fixed as a bracket onto the flap 10 (see also on this subject the detail view in FIG. 5). Suitably, the horizontal axes of articulation 39 of the jacks on the housing 9 are parallel to the axis 32 of pivotting of the flap 10, being positioned out of the vertical plane passing through that axis and on the side of this plane opposite to that of the oblique plate 28, in such a way that—as will be seen later—on each side of a position of unstable equilibrium which is close to the line passing through the axes 32 and 39 and in which the longitudinal axes of the jacks 34 are parallel to the flap 10, the jacks tend to automatically push the flap either into its folded up position (in dotted lines in FIG. 4), or into its opened out or raised position (in full lines).

As is also seen in FIG. 4, the lateral wings 24 of the flap 10 and the lateral wings 19 of the flap 11 have adjacent ends widened into a triangular shape which are articulated on each side of the leg-rest by means of rotational linking members 44 of known type, for example bolts, pins or the like. The flap 11 is linked to the flap 12 by means of a hinge joint 45, whilst the flap 12 is also linked to the flap forming the prop 13 by a hinge joint 46. As appears from the drawing, during the folding of the leg-rest, the flap 10 is lowered by pivotting about its axis 32 in coming into its lowered position 10' against the stops 33, the hinge 44 lowers and the flap 11 comes to bear flat against the flap 10 adopting the position 11', its cushion 14 adopting the position 14'. Furthermore, after the previous lowering of the flap forming the prop 13 against the inside surface of the flap 12, the latter is folded against the flap 11, which brings it into position 12', in which its cushion 15 is in position 15'. In the folded-up position of the leg-rest 8, all the flaps are therefore drawn up between the lateral side-plates 26 of the housing 9, with only the cushion 15 sticking out frontwards.

Finally FIG. 6 shows a detail of a variant of the embodiment of the invention, in which the pneumatic jacks 34 are replaced by systems 47 each formed by a compression spring 48 inserted for example in two telescopic guide-sleeves 49, 50 linked by tabs 51, 52 and axes of articulation 53,54 to the brackets 40, 41 carried by the plate 28 and the movable flap 10, in the same way as in the case of FIG. 4.

The functioning of the leg-rest according to the invention is as follows: in the folded up, out-of-use position, the flaps 10, 11, 12, 13 are in their positions 10', 11', 12', 13' shown in dotted lines in FIG. 4, the jacks being in the oblique rear position 34', where they jut out a bit relative to the flap 10, which is permitted by the presence of the slits 25 in the flap 10 and which are crossed at least partially by the jacks 34 and their supports 40 fast with the oblique plate 28. In this position the jacks push permanently and resiliently—by means of supports 43—the flap in its folded back position 10', and hold it locked there. The assembly of flaps 11, 12, 13 which would possibly be able to be separated from only the lower level of the flap 10, is also held in its folded up position because that edge of the cushion 15 (which bears the handle 16) of the flap 12 which is lower in the folded up position is broadened so that the cushion 15 is pressed against the ground in its position 15'. Of course, the fact that the hinges 45, 46 may be of the type which is slightly force-tightened also contributes to holding the flaps 11, 12, 13 in their relative positions.

When it is desired to open out the leg-rest one pulls on the handle 16, which causes an expansion and pivoting of the flaps 11, 12, 13 to the right in FIG. 4, the flap 11 bringing the flap 10 with it when the force exerted on the handle 16 is enough to overcome the permanent automatic action of the jacks 34. This force to be overcome diminishes progressively during the rotation of the flap 10 in the clockwise direction as far as an intermediate position of unstable equilibrium placed in an angular range surrounding an imaginary straight line passing through the axes 32 and 39 and in which the longitudinal axes of the jacks are substantially parallel to the flap 10. It is a very quickly reached position beyond which—apart from the continuation of the rotation of the flap 10—the elastic compression action of the jacks 34 helps the pulling force exerted on the handle 16 and pushes the flap 10 automatically and stably towards its raised position, shown in full lines in FIG. 4, holding it locked there. To put the leg-rest completely into place, the flaps 11 and 12 are completely unfolded, as well as the flap forming the prop 13 by using the lateral buttons 17 of the latter.

In order to fold up the leg-rest 8, the sequence of operations is followed in reverse, i.e. the flap 13 is folded up against the flap 12, then the latter against flap 11 and finally the assembly 13, 12, 11 against the flap 10 at the same time lowering the latter by making it pivot about its axis of rotation 32 overcoming the action of the jacks up to the level of the intermediate equilibrium beyond which the jacks assist the folding-up action of the leg-rest by means of the force which they exert on the flap 10, which comes to bear against the stops 33.

Naturally, the invention is not limited to the modes of embodiment which have been mentioned and divers variants can be imagined without departure from the principles of the present invention.

I claim:

1. Foldable leg-rest assembly removably connectable to a horizontal underseat luggage-restraining cross bar of a vehicular seat of the type employed in airliners and passenger railway cars, without need to modify the seat for installation or removal of the leg rest assembly, comprising
   a non-swinging frame to be removably coupled to said cross bar, said non-swinging frame including a pair of substantially vertical side plates joined at their lower ends by a horizontal member, the side plates being parallel and each having an integral downwardly extending finger at a rear side thereof to define a substantially vertical cut out to overfit said cross bar, and including a plate member joining rearward edges of said fingers, leaving open a top side and a front side of said non-swinging frame to receive other portions of said leg-rest assembly in a folded position thereof;
   a first flap pivoted on said non-swinging frame;
   a holding device linking said first flap and said non-swinging frame and automatically holding said first flap on each side of an unstable center position, to maintain stably the first flap in its folded position and in an opened-out position; and
   three supplementary flaps articulated with each other, one of which is articulated to said first flap, and a last one of which serves as a prop.

2. Leg-rest assembly according to claim 1, wherein said holding device is formed of at least one member exerting an elastic compression pushing the first flap stably into its folded and opened-out positions.

3. Leg-rest assembly according to claim 2, wherein said holding device includes a pair of pneumatic jacks of the type having a cylindrical sleeve and a piston, and in which the sleeve is articulated by a linkage to the non-swinging frame of the leg rest while the piston is connected to a piston rod articulated to the first flap.

4. Leg-rest assembly according to claim 2, wherein said holding device includes a pair of compression springs, each of which has one end attached to a portion of said non-swinging frame of the leg-rest assembly, and another end attached to said first flap.

5. Leg-rest assembly according to claim 2, 3, or 4, wherein said first flap is articulated on said non-swinging frame at a pivot axis, and said holding device is articulated on said non-swinging part at an axis of articulation thereof, said axis of articulation being situated off the vertical plane passing, in operation, through said pivot axis and on the side of such vertical plane opposite to the side which said first flap occupies in its folded position so a position of unstable equilibrium is defined between the folded and opened-out positions, and on either side of said position of unstable equilibrium said holding device urges said first flap automatically into the respective one of its folded and opened-out positions.

6. Leg-rest according to claim 5, wherein said first flap has two parallel slits of sufficient size to permit passage of said holding device therethrough when said assembly is in its folded position.

7. Leg-rest assembly according to claim 5, wherein said non-swinging frame of said leg-rest assembly further includes, for receiving said flaps in said folded position, bearings disposed at an upper end on which said first flap is articulated.

8. Leg-rest assembly according to claim 7, wherein one or more flaps beyond said first flap are provided with cushions.

9. Leg-rest assembly according to claim 7, wherein the flap forming the prop has, on opposite sides thereof, gripping protuberances for facilitating unfolding of the latter flap.

10. Leg-rest assembly according to claim 1, wherein the length of each said flap is no greater than the height of said non-swinging frame, so that the flaps can be folded up against each other and within the non-swinging frame in the manner of an accordion, the non-swinging frame serving as a housing for the folded flaps.

11. Leg-rest assembly according to claim 1, wherein the flaps are articulated such that the direction of displacement of the articulation between the first flap and the flap adjacent the first flap is upwards, in an unfolding operation; the direction of displacement of said adjacent flap and the next of the flaps is downwards, in an unfolding operation; and the orientation of articulation of said first flap relative to the non-swinging part and of said next flap with the remaining flap is the same as that of said flap adjacent the first flap and said next flap.

12. Leg rest assembly according to claim 1, wherein said holding device is a dead-center-clearing holding device.

13. Leg rest assembly according to claim 1, wherein said plate member is obliquely oriented at said rearward edges of said fingers.

14. Leg rest assembly according to claim 1, wherein said side plates are dimensioned to fit between a floor and a seat cushion of the vehicular seat when in place with said vertically extending finger disposed over said cross bar.

* * * * *